No. 794,526. PATENTED JULY 11, 1905.
C. R. MAPLES.
UNLOADING MECHANISM.
APPLICATION FILED SEPT. 12, 1904.
2 SHEETS—SHEET 2.
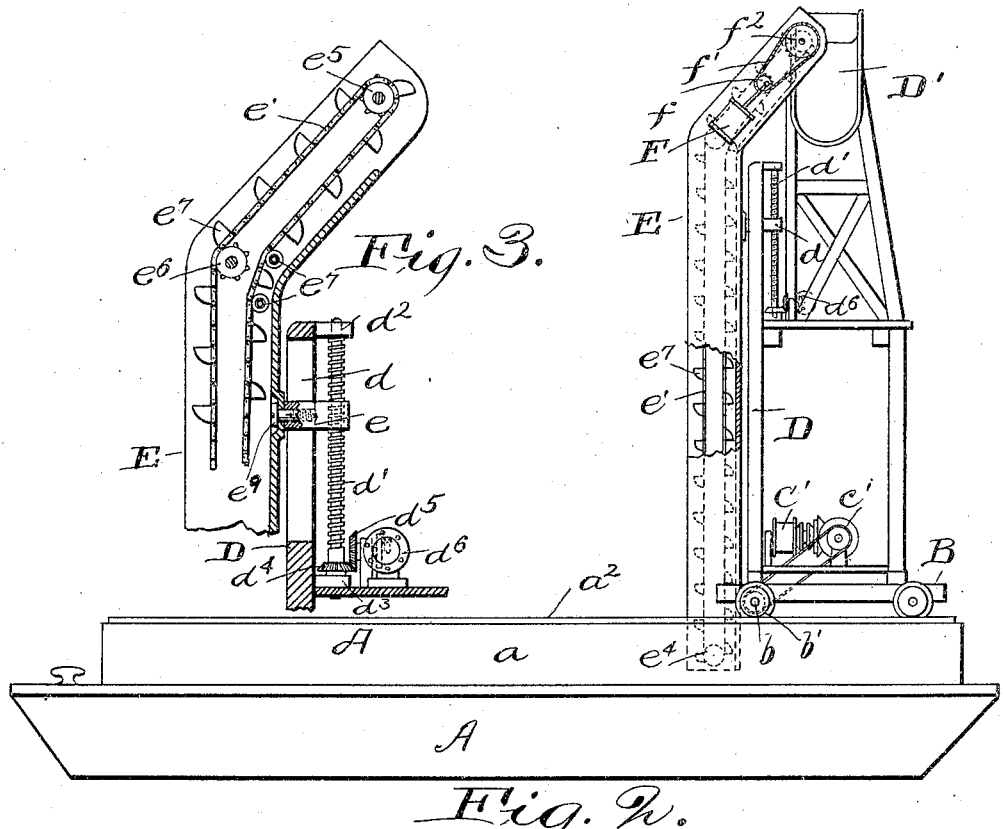
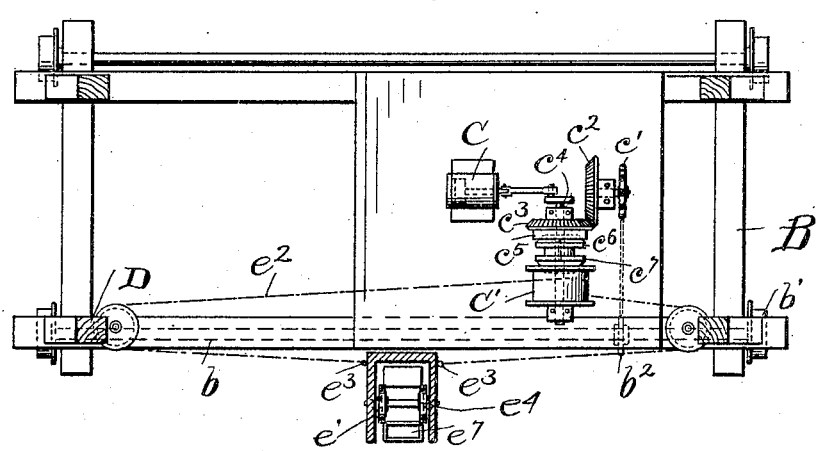
Witnesses.
E. B. Gilchrist
B. W. Brockett
Inventor
Charles R. Maples
By his Attorneys,
Thurston & Bates No. 794,526.                               Patented July 11, 1905.

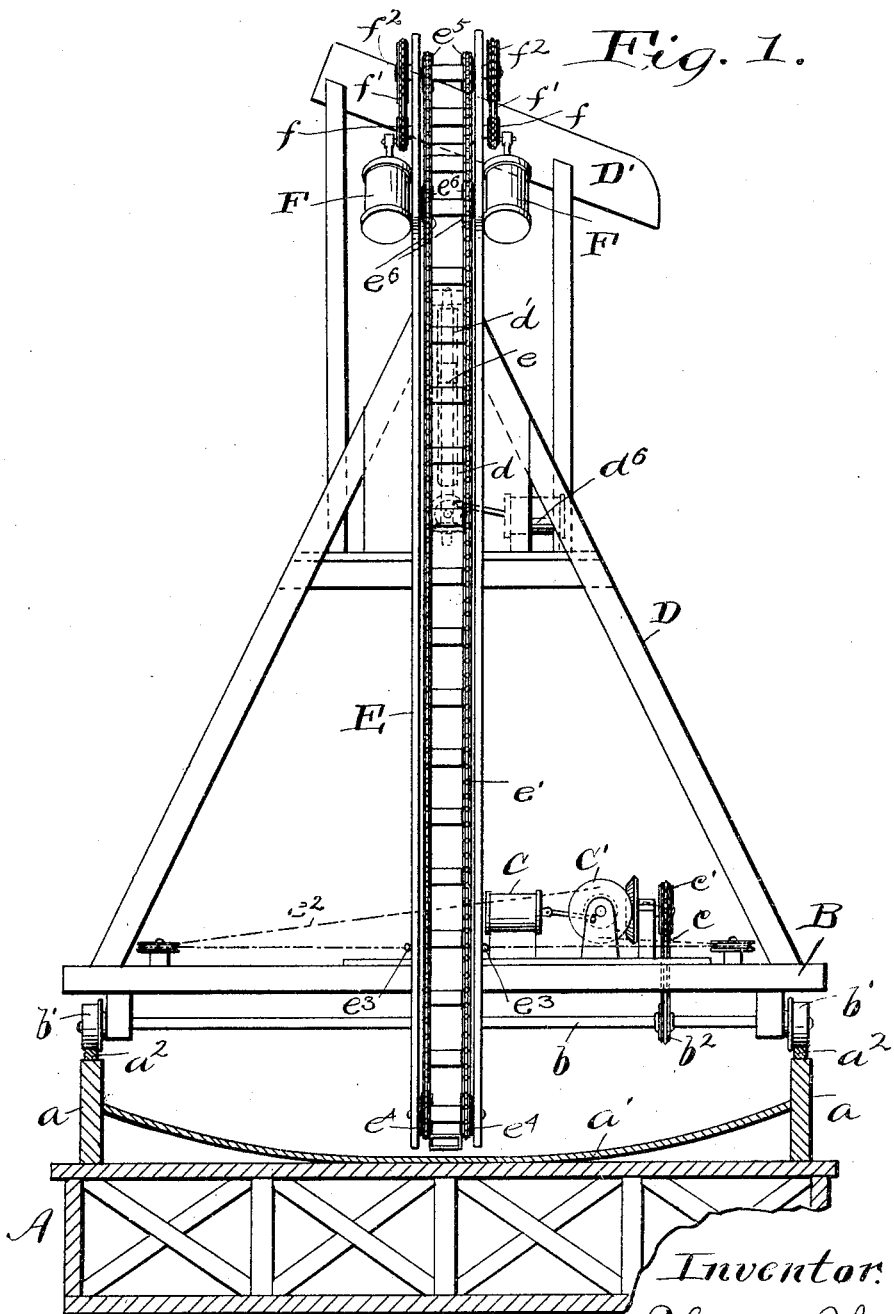

UNITED STATES PATENT OFFICE.

CHARLES R. MAPLES, OF DULUTH, MINNESOTA.

UNLOADING MECHANISM.

SPECIFICATION forming part of Letters Patent No. 794,526, dated July 11, 1905.

Application filed September 12, 1904. Serial No. 224,062.

*To all whom it may concern:*

Be it known that I, CHARLES R. MAPLES, a citizen of the United States, residing at Duluth, in the county of St. Louis and State of Minnesota, have invented a certain new and useful Improvement in Unloading Mechanism, of which the following is a full, clear, and exact description, reference being had to the accompanying drawings.

The invention relates generally to unloading devices for unloading sand and other material from barges, scows, and other similar vessels, and contemplates the use of an endless conveyer mounted in a suitable trough suspended from and mounted upon a framework erected upon a truck adapted to be rolled onto the barge, so as to give the endless conveyer access to the load in the hold thereof.

More specifically, I employ a truck or flat-car provided with flanged wheels adapted to run on rails carried by the sides of the scow and having mounted upon it a suitable framework for carrying a swinging trough provided with an endless conveyer therein which is adapted to extend down into the vessel and elevate the sand or other material to the upper part of the framework, where it is dumped into a suitable chute or trough emptying into a car or any other suitable receptacle.

The invention may be briefly summarized as consisting in the construction and combination of parts hereinafter described, reference being had to the accompanying drawings, specification, and claims.

Referring to the drawings, Figure 1 is an end elevation of the truck after it has been moved onto the scow, showing the scow in cross-section. Fig. 2 is a side elevation of the device upon the top of the scow. Fig. 3 is a sectional view through the conveyer; and Fig. 4 is a top plan view of the truck, showing the engine and operating mechanism for moving the truck and for manipulating the trough, which is shown in cross-section.

In practicing my invention any preferred construction of device and scow may be employed; but I have shown in the drawings a very effective structure which carries out my invention. In such embodiment A represents a scow provided with side members $a$, of ordinary construction, and a curved bottom floor $a'$, which is also of ordinary construction. On the top edges of the side members $a$ is a pair of track-rails which are adapted to receive and guide the truck of my improved unloading device. This unloading device consists of a truck B, provided with axles $b$, carrying flange-wheels $b'$, which take upon the track-rails $a^2$. This truck is driven by a sprocket-wheel $b^2$, keyed to one of the axles $b$ and provided with a sprocket-chain $c$, driven by a sprocket-wheel $c'$, receiving its rotation from a bevel-gear $c^2$, meshing with a bevel-gear $c^3$, loosely mounted upon a shaft $c^4$, driven from an engine C. The gear $c^3$ is provided with a clutch member $c^5$, adapted to be engaged by a clutch member $c^6$, loosely splined to the shaft $c^4$, whereby upon the engagement of the clutch members with each other the engine is free to drive one of the axles of the truck and move it along the track into any desired position. The shaft $c^4$ is further provided with a winding-drum C', loosely mounted upon the shaft and having upon one of its faces a clutch member which is adapted to be engaged by a clutch member $c^7$, rigid with the clutch member $c^6$, whereby the shaft $c^4$ may be coupled with the drum. This drum is for a purpose which will later appear. Mounted upon this truck is a suitable framework D, having at its extreme upper end a chute D', which is adapted to empty into any suitable receptacle. (Not shown.) The framework is further provided with a guiding-slot $d$ in one of its members, which is adapted to receive a pivot-block $e$ for supporting the conveyer-trough E, hereinafter described. This pivot-block is provided with a threaded opening which takes upon a long screw $d'$, mounted vertically in the bearings $d^2$ $d^3$ and having near its lower end a bevel-gear $d^4$, meshing with a bevel-gear $d^5$, driven by an engine $d^6$. From this construction it is quite obvious that when it is desirable to raise or lower the excavating-trough, either to let it down into the material or raise it up when removing the entire device or for any other reason, then this engine $d^6$ is operated, thus rotating the screw $d'$ and moving the pivot-block $e$ so as to carry the trough up or down, as the case may be.

The trough E is swiveled to the pivot-block $e$ by means of a screw or bolt $e^9$ (shown in Fig. 3) in such a manner that it is free to swing upon this screw or bolt as a pivot, and thus move the lower end of the trough from one side of the scow to the other, and this movement is brought about by means of a rope $e^2$, which takes several turns around the drum C' and is connected at its free ends to eyes $e^3$, secured to the sides of the trough. This permits the conveyer within the trough to be made accessible to all parts of the scow.

The upper end of the trough E is inclined backward, so as to present the open end thereof directly above the chute D' when the lower end of the trough is shifted in any position.

Within the trough E is an endless conveyer consisting of a pair of chains $e'$, taking around a pair of loose sprockets $e^4$ at the bottom of said trough, and a pair of driving-sprockets $e^5$ at the extreme upper end of said trough. Suitable guiding-sprockets $e^6$ are provided at the turn in said trough for guiding the front members of the sprocket-chains, and suitable rollers $e^7$ serve to guide the other members of these chains in the back of the trough at the point where it starts to incline backward. At suitable intervals upon these chains are mounted the buckets $e^7$, which are adapted to extend outward from said chain and to dig into the sand or other material, fill themselves, and convey their load to the upper end of the trough and dump it into the chute D', from whence it is free to slide into the receiving-receptacle. Engines F are provided on either side of the trough, near its upper end, to drive sprocket-wheels $f$, geared by chains $f'$ to driven sprockets $f^2$, keyed upon the shaft carrying the sprocket-wheels $e^5$.

To describe the complete operation of the device, the scow is moved up to the dock, (not shown,) and the truck B is driven from suitable tracks thereon directly onto the sides of the scow by the driving mechanism heretofore described, the trough E having been elevated to clear the end of the scow. It is of course necessary that the chute D' shall be arranged to empty into some sort of a receptacle or other chute. The endless conveyer is then driven by the driving mechanism for that purpose and the entire trough then lowered into the material, when the buckets upon the sprocket-chains in the trough will become filled with the material and will convey it to the upper end of the trough and dump it into the chute D'.

While I have described the chute D' as emptying into any suitable receptacle, an additional chute may be provided whereby there will be sufficient fall to lead the sand or other material conveyed to the chute D' down onto the dock or into a car or other suitable receptacle.

Having described my invention, I claim—

1. In an unloading-machine, the combination of a trough bent backward near its upper end, a support on the rear side of the trough, to which the trough is pivoted on a pivot below its backwardly-bent portion, the lower portion of the trough depending vertically from the front of the pivot, means for swinging the trough as a whole upon said pivot, and an endless conveyer mounted in the trough.

2. In an unloading-machine, the combination with a truck, of a trough mounted near its upper end upon said truck, on a pivot which is substantially parallel with the direction of the movement of the truck, an endless conveyer within said trough, means for swinging the lower end of said trough transversely into any desired position, means for operating said conveyer, and a chute into which said conveyer discharges irrespective of its position, the upper end of the trough being bent backward above its pivot to a point over the chute.

3. In an unloading-machine, the combination with a framework, of a trough, a pivot-block for supporting said trough, means for raising and lowering said block, an endless conveyer in said trough, means for driving the same, and means for swinging said trough sidewise upon its pivot.

4. In an unloading-machine, the combination with a framework, of a trough vertically arranged and pivoted to said framework, means for raising and lowering said trough, an endless conveyer in said trough, and a chute near the upper end of said trough adapted to receive the material from said conveyer, means mounted on the trough for driving said conveyer, and means for swinging sidewise the lower end of said trough.

5. In an unloading-machine, in combination with a truck, a trough pivotally mounted upon said truck, on an axis intersecting the planes of travel of the conveyer, an endless conveyer within said trough, an engine mounted upon said trough near its upper end for driving said conveyer, and means for swinging the lower end of said trough.

6. In an unloading-machine, in combination, a truck, a chute carried thereby, a vertical trough pivotally mounted on said truck, said trough above the pivot being bent to terminate over the chute, an endless conveyer mounted in said trough and consisting of chains and buckets, and sprocket-wheels for the chains, a shaft on which two of said sprocket-wheels are mounted, and a pair of engines mounted on said chute on its opposite sides and connected to drive said shaft.

In testimony whereof I hereunto affix my signature in the presence of two witnesses.

CHARLES R. MAPLES.

Witnesses:
C. F. SMIEDEL,
B. W. BROCKETT.